United States Patent [19]
Ikeda et al.

[11] Patent Number: 5,224,244
[45] Date of Patent: Jul. 6, 1993

[54] BUNDLING FASTENER

[75] Inventors: Tomohiro Ikeda; Shigehiko Kobayashi, both of Shizuoka, Japan

[73] Assignee: Yazaki Corporation, Tokyo, Japan

[21] Appl. No.: 751,387

[22] Filed: Aug. 28, 1991

[30] Foreign Application Priority Data

Aug. 29, 1990 [JP] Japan .................. 2-89472[U]

[51] Int. Cl.⁵ .............................. B65D 63/00
[52] U.S. Cl. .................. 24/16 PB; 24/17 AP; 248/74.3
[58] Field of Search .......... 24/16 PB, 17 AP, 30.5 P; 248/74.3

[56] References Cited

U.S. PATENT DOCUMENTS

| | | | |
|---|---|---|---|
| 3,744,096 | 7/1973 | Kok | 24/16 PB |
| 4,573,242 | 3/1986 | Lankton et al. | 24/16 PB |
| 4,665,588 | 5/1987 | Nakano | 24/16 PB |
| 4,669,688 | 6/1987 | Itoh et al. | 248/74.3 |
| 4,705,245 | 11/1987 | Osada | 24/16 PB |
| 4,862,561 | 9/1989 | Lichtenberg | 24/16 PB |
| 4,882,813 | 11/1989 | Nakamura | 24/16 PB |
| 4,944,475 | 7/1990 | Ono et al. | 248/74.3 |
| 4,958,414 | 9/1990 | Benoit | 24/16 PB |

Primary Examiner—Victor N. Sakran
Attorney, Agent, or Firm—Sughrue, Mion, Zinn, Macpeak & Seas

[57] ABSTRACT

A bundling fastener for securing a bundling band wrapped around a plurality of articles and having engaging slots or protrusions formed thereon at equal intervals. The fastener includes an inserting chamber into which the bundling band is inserted, and an accommodating chamber for receiving the end portion of the bundling band after it has been wrapped around the articles. These chamber are adjacent one another and each has a height substantially equal to the thickness of the bundling band. Further, each of the chambers includes a flexible deflecting means and saw-tooth-shaped locking protrusions to be engaged with the engaging slots or protrusions of the band, in such a manner that the locking protrusions of the inserting chamber are opposite in direction to those of the accommodating chamber. Due to this construction, the bundling band is economically used, and the bundling operation is achieved with high space efficiency.

23 Claims, 11 Drawing Sheets

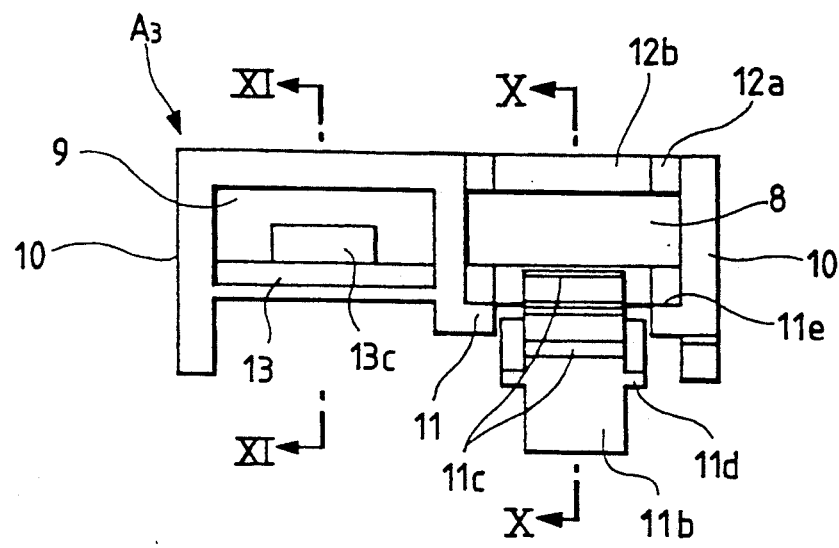
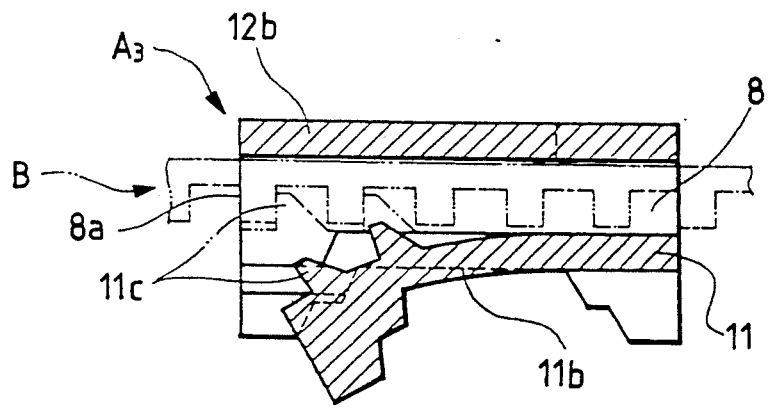
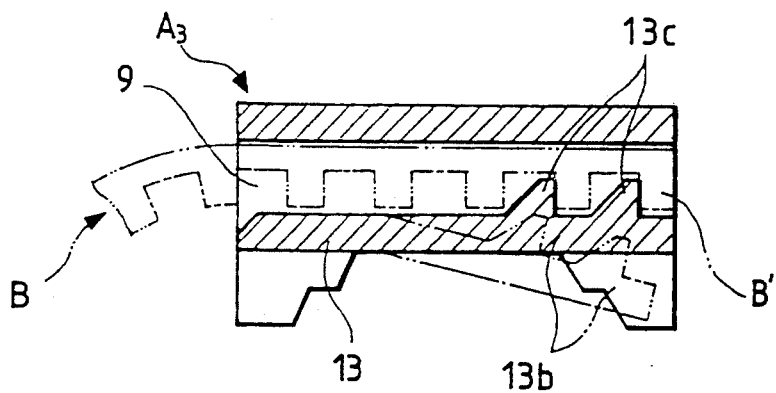

BUNDLING FASTENER

BACKGROUND OF THE INVENTION

1. Field of the Invention

This invention relates to a fastener which is used to bundle elongate articles such as electric wires with a band.

2. Background

A conventional bundling fastener will be described with reference to FIG. 21. As shown in FIG. 21, the conventional bundling fastener a has a vertically extending band support hole b, and locking pieces $c_1$ and $c_2$ projecting toward each other proximate the upper edge of the band supporting hole b. A band d having engaging projection d on one side thereof is passed through the band supporting hole b, and wrapped around a bundle of articles w, such as electric wires. Thereafter, the end portion $d_2$ of the band d is again passed through the band supporting hole b, and is engaged with one locking piece $c_2$ through the engaging projections $d_1$. Under this condition, the supply side $d_3$ of the band d is pulled outwardly to tighten the articles so that it is engaged with the other locking projections $c_1$. Thereafter, the surplus of the band d is cut off. Such an arrangement is disclosed in Japanese Patent Examined Publication No. 35876/1975.

With the conventional bundling fastener described above, the band is removed after tightening the articles, and therefore excess band is not used. However, the bundling fastener is still disadvantageous in that undesireable spaces are formed between the bundled articles w and the bundling fastener a so that the fastener a protrudes from the articles w. Thus, the bundling fastener a makes inefficient utilization of space. FIG. 22 illustrates another example of a conventional bundling fastener which is disclosed in Japanese Utility Patent Application (OPI) No. 34182/1981 (the term "OPI" as used herein means an "unexamined published application"). This bundling fastener a' comprises upper and lower band inserting chambers $b_1'$ and $b_2'$ having flexible locking members $c_1'$ and $c_2'$, respectively. With this bundling fastener a', the band d' having engaging projections $d_1'$, on both sides thereof is cut in advance to a length which is long enough to bundle elongate articles w such as electric wires. One end portion $d_2'$ of the band is inserted into the lower band inserting chamber $b_2'$ and is locked to the flexible locking piece $c_2'$. Under this condition, while the elongate articles w is being bundled with the band, the other end portion $d_3'$ is inserted into the upper chamber $b_1'$ and pulled outwardly. The surplus of the band is then removed.

Hence, the bundling fastener is free from the difficulty accompanying the bundling fastener described with reference to FIG. 21. However, it is still disadvantageous in that the band is not economically used because it is cut in advance. Thus, the probability of wasting a portion of the band is great.

SUMMARY OF THE INVENTION

In view of the foregoing, an object of this invention is to provide a bundling fastener for a bundling band, with which an elongate article bundling operation is achieved with high space efficiency, and the band is economically used.

The foregoing object and other objects of the invention has been achieved by the provision of bundling fastener for a band having engaging means formed thereon along a longitudinal axis thereof at equal intervals. The fastener comprises an inserting chamber into which the band is inserted and an accommodating chamber disposed adjacent the inserting chamber for receiving the end portion of the bundling band. The inserting and accommodating chambers each have a height substantially equal to the thickness of the bundling band, and include a flexible deflecting means and saw-tooth-shaped locking protrusions to be engaged with the engaging means of the bundling band, in such a manner that the locking protrusions of the inserting chamber are opposite in direction to those of the accommodating chamber.

The nature, utility and principle of the invention will be more clearly understood from the following detailed description and the appended claims when read in conjunction with the accompanying drawings.

BRIEF DESCRIPTION OF THE DRAWINGS

In the accompanying drawings:

FIG. 9 is a front view of the bundling fastener shown in FIGS. 7 and 8;

FIG. 10 is a sectional view taken along line X—X in FIG. 9;

FIG. 11 a sectional view taken along line XI—XI in FIG. 9;

DETAILED DESCRIPTION OF PREFERRED EMBODIMENTS

Figure 1:
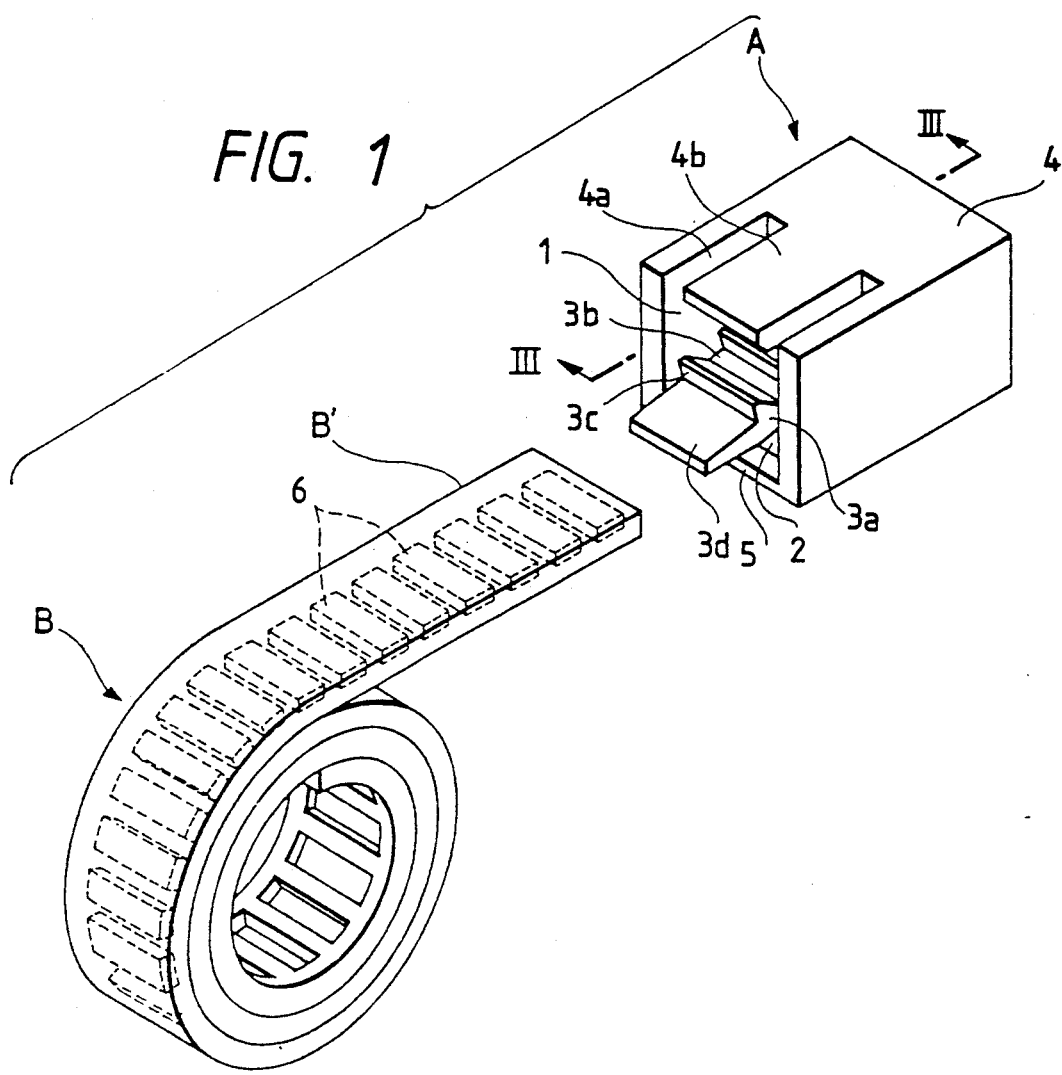
FIG. 1 a perspective view showing a first embodiment of a bundling fastener according to this invention together with a bundling band.
Figure 2:
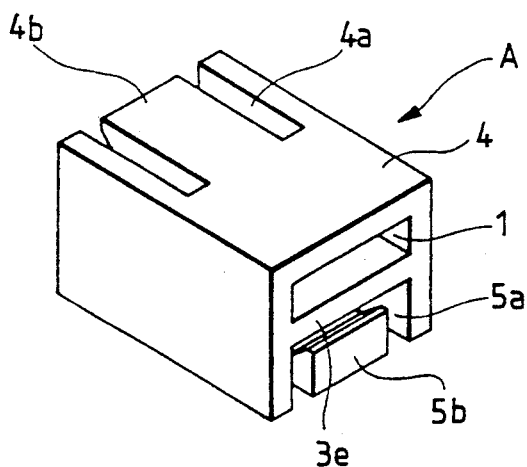
FIG. 2 is another perspective view of the bundling fastener shown in FIG. 1.
Figure 3:
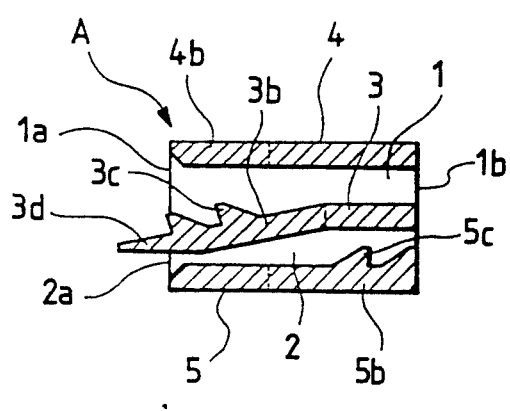
FIG. 3 is a sectional view taken along line III—III in FIG. 1.

A first embodiment of a bundling fastener according to the invention will be described with reference to FIGS. 1 through 4. In FIG. 1, reference character A designates a first example of a bundling fastener of synthetic resin which is used together with a bundling band B of synthetic resin. That is, after articles such as electric wires are bundled with the bundling band B, both ends of the bundling band B are locked with the bundling fastener A.

The fastener A is in the form of a rectangular parallelepiped, which is divided by a partition wall 3 into an upper chamber, namely, an inserting chamber 1 for receiving the band B, and a lower chamber, namely, an accommodating chamber 2 for receiving the end portion B' of the band B. The chambers 1 and 2 have a height substantially equal to the thickness of the bundling band B. One end portion of the partition wall 3, on the side of openings 1a and 2a of the upper and lower chambers 1 and 2, is formed into a cantilevered flexible locking piece 3b with slits 3a on both sides thereof. The flexible locking piece 3b has saw-tooth-shaped engaging protrusions 3c protruding therefrom on the side of the inserting chamber 1. The outermost end portion of the flexible locking piece 3 is formed into an operating end portion 3d which extends outside the fastener. The flexible locking piece 3b is deflected towards the accommodating chamber 2 when not used.

Slits 4a are cut in the outer wall 4 of the inserting chamber 1, to form a cantilevered flexible relief piece 4b which is confronted with the above-described flexible locking piece 3b. On the other hand, slits 5a are cut in the wall 5 of the accommodating chamber 2, to form a cantilevered flexible locking piece 5b which is confronted with the fixed portion 3e of the partition wall 3. The flexible locking piece 5b has saw-tooth-shaped locking protrusions 5c on its inner surface to automatically locking the band B.

A series of engaging recesses 6 are formed in the band B at equal intervals. Alternatively, the engaging recesses 6 may be replaced with engaging protrusions.

Figure 4A:
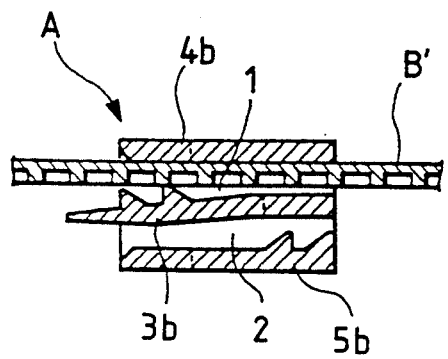
FIGS. 4(a), 4(b), 4(c), 4(d), and 4(e) are sectional views for describing the operation of bundling elongate articles with the bundling fastener and the bundling band shown in FIG. 1.

The bundling fastener is used as follows. The end portion B' of the bundling band B which has been wound is inserted through the opening 1a into the inserting chamber 1, and is then pulled out of the inserting chamber 1 through the opposite opening 1b, as shown in FIG. 4(a). The insertion of end B' is not obstructed by the flexible locking piece 3b, because the locking piece 3b has been deflected towards the accommodating chamber 2.

Figure 4B:
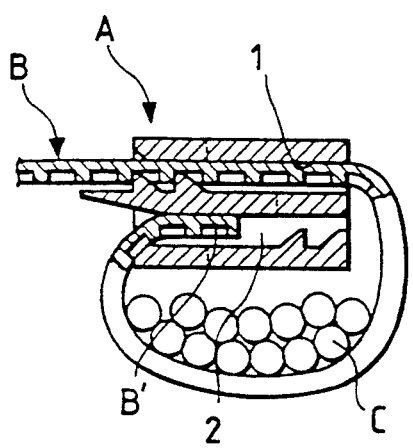

Next, as shown in FIG. 4(b), articles C, such as electric wires, are bundled with the band B thus pulled out. While the operation end portion 3d is pushed upwardly with a finger or with the end portion of the band B to deflect the flexible locking piece 3 towards the inserting chamber 1, the end portion B' of the band B is inserted into the accommodating chamber 2.

Figure 4C:
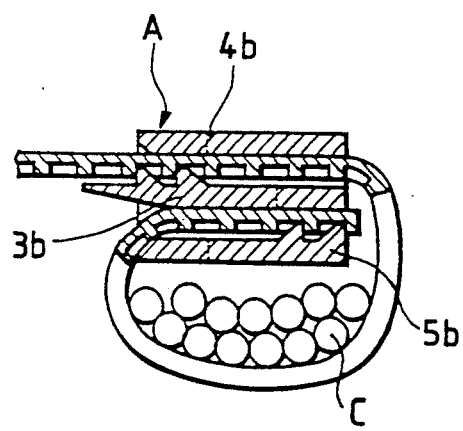

As shown in FIG. 4(c), the end portion B' is further inserted into the accommodating chamber 2, so that while the flexible locking piece 5 is deflected downwardly, the locking protrusions 5c are automatically engaged with the engaging recesses 6. The locking protrusions 5c, being in the form of saw teeth, positively prevents the end portion B' from slipping out of the opening 2a. On the other hand, the flexible locking piece 3b is supported by the end portion B' of the band B, and therefore its locking protrusions 3c are positively engaged with the engaging recesses 6 of the bundling band B.

Figure 4D:
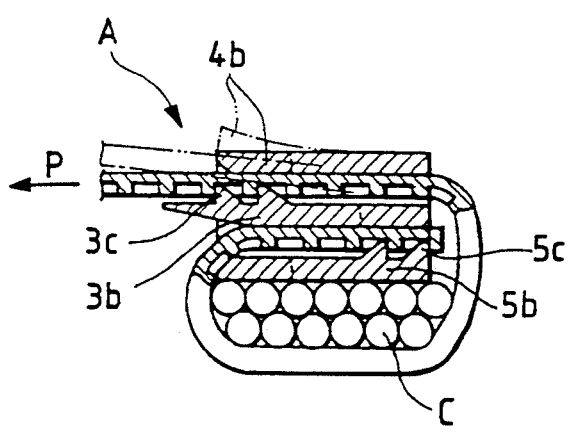
Figure 4E:
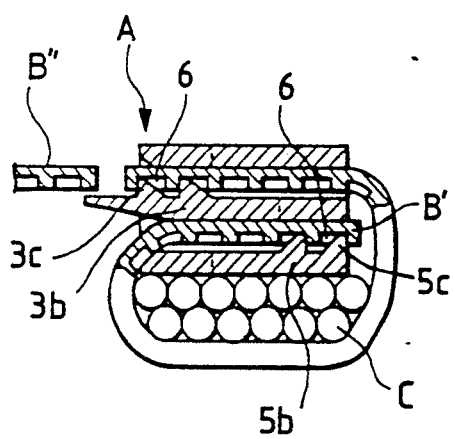

Under this condition, the supply roll of the bundling band B is pulled in the direction of the arrow P as shown in FIG. 4(d), to tighten the articles C. In this operation, the direction of the saw-tooth-shaped locking protrusions 3c and the outward displacement of the flexible relief piece 4b allow the bundling band B to move to tighten the articles C. At the same time, the locking protrusions 3c prevent the movement of the bundling band B in the opposite direction to maintain the articles C bundled. After the articles C have been bundled in this manner, the surplus B' of the band B is cut off as shown in FIG. 4(e).

Figure 5:
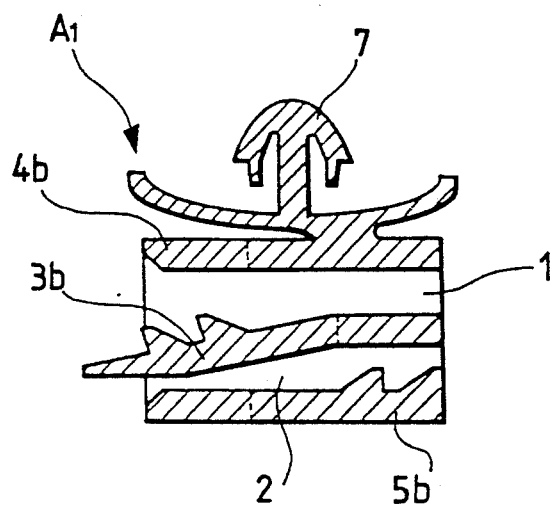
FIGS. 5 and 6 are sectional views showing second and third embodiments of the bundling fastener according to the invention, respectively.

FIG. 5 illustrates a second embodiment of the bundling fastener according to the invention wherein a mounting clamp 7 is extended from the outer wall 4 of the fastener.

Figure 6:
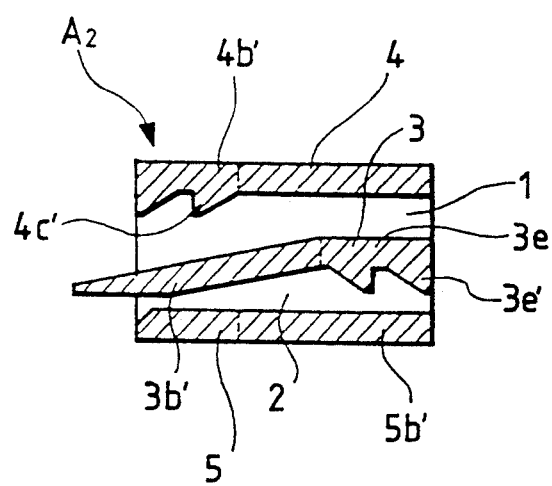

FIG. 6 illustrates a third embodiment of the fastener according to the invention. In the bundling fastener $A_2$, the partition wall 3 has a flexible relief piece 3b', and the outer wall 4 includes a flexible locking piece 4b' with saw-tooth-shaped locking protrusions 4c' formed therein in such a manner as to confront the flexible relief piece 3b'. Furthermore, a flexible relief piece 5b' is formed in the inner wall 5, and saw-tooth-shaped locking protrusions 3e' are formed on the fixed portion 3e of the partition wall 3 which confronts the flexible relief piece 5b'. Thus, automatic locking means is provided for the bundling band.

A fourth embodiment of the bundling fastener according to the invention will be described with reference to FIGS. 7 through 12. The bundling fastener $A_3$ has an inserting chamber 8 for receiving the bundling band b, and an accommodating chamber 9 for receiving the end portion B' of the band B. These chambers 8 and 9 are provided side by side. Cuts 10a and 10a are formed in both side walls 10 and 10 of the bundling fastener so that the latter may be snugly brought into contact with articles C to be bundled.

Slits 11a are formed in the inner wall 11 of the inserting chamber 8 on the side of its one opening 8a, to form a cantilevered flexible locking piece 11b. The flexible locking piece 11b has saw-tooth-shaped locking protrusions 11c on its surface on the side of the inserting chamber 8. The flexible locking piece 11b is deflected away from the inserting chamber 8 when not in operation. When the flexible locking piece 11b is in operation, locking protrusion 11d extending from both sides of the flexible locking piece 11b are engaged with the slot ends 11e of the inner walls, so that the flexible locking piece 11b is set at a band locking position. Slits 12a are formed in the outer wall 12 of the inserting chamber 8, to form a cantilevered relief piece 12b which is confronted with the flexible locking piece 11b.

On the other hand, slits 13a are formed in the inner wall 13 of the accommodating chamber 9, to form a cantilevered flexible locking piece 13b, which extends in a direction opposite to the direction in which the flexible locking piece 11b extends. The flexible locking piece 13b has saw-tooth-shaped locking protrusions 13c on its surface on the side of the accommodating chamber 9.

Figure 7:
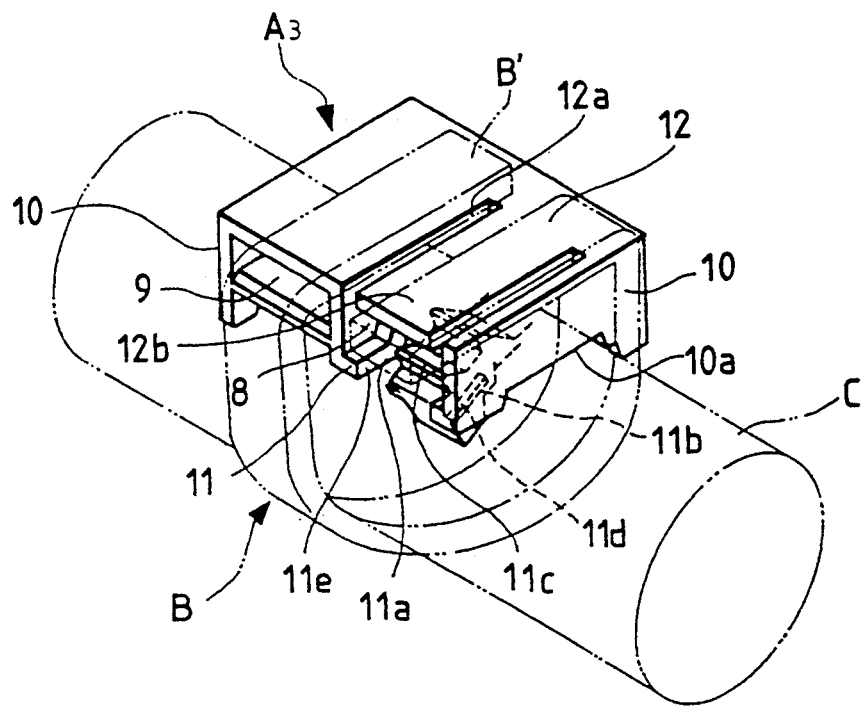
FIG. 7 is a perspective view of a fourth embodiment of the bundling fastener according to the invention as viewed from the front.
Figure 8:
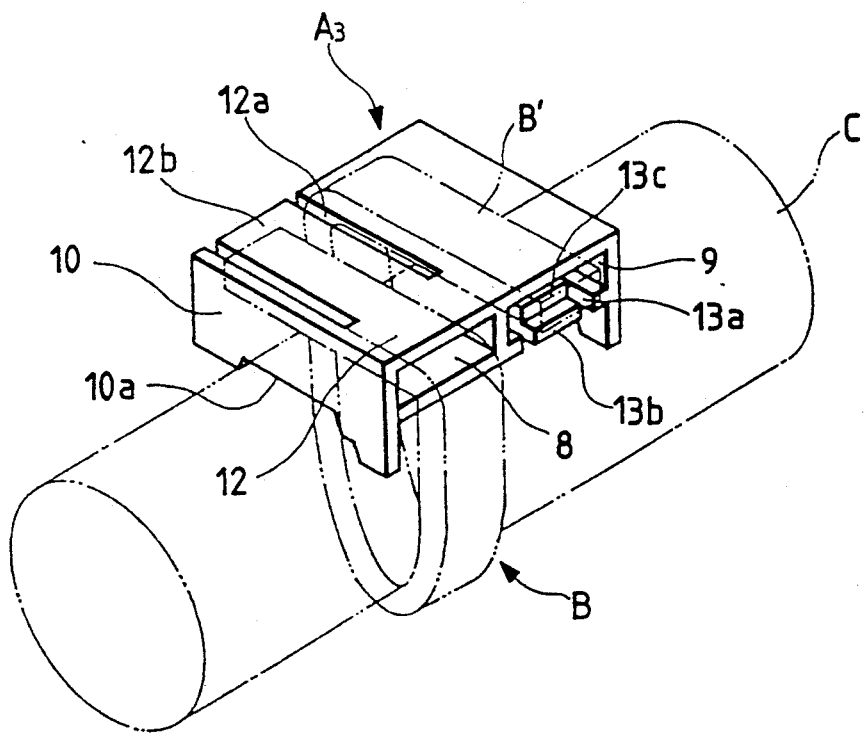
FIG. 8 is another perspective view of the FIG. 7 bundling fastener as viewed from the rear.

The bundling fastener thus constructed is used as follows. First, the end portion B' of the band B is inserted into the inserting chamber 8 through its opening 8a and pulled out of the inserting chamber. Then, the articles C are bundled with the end portion B' thus pulled out. Under this condition, the end portion B' is inserted into the accommodating chamber 9 through its opening 9a, so that it is locked with the saw-tooth-shaped locking protrusions 13c of the flexible locking piece 13b, as illustrated in FIGS. 7, 10 and 11.

Figure 12A:
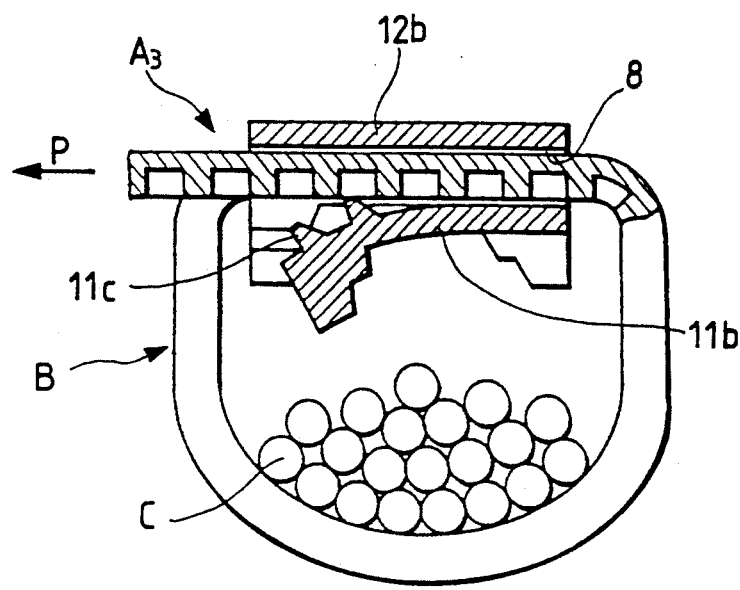
FIGS. 12(a) and 12(b) are sectional views for describing the operation of bundling elongate articles with the bundling fastener and band illustrated in FIG. 7.
Figure 12B:
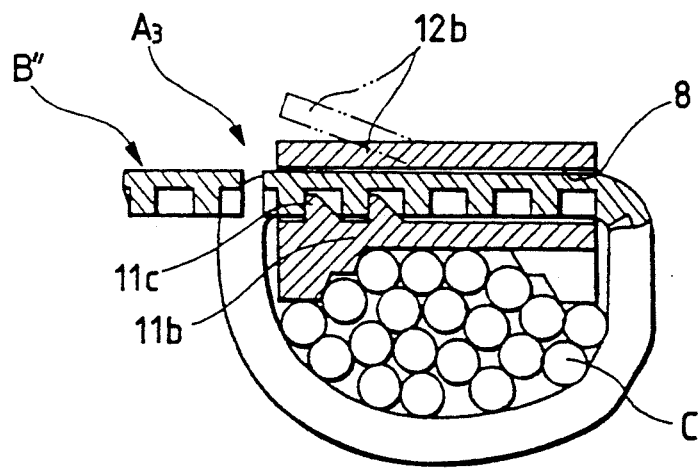

Under this condition, the bundling band B is pulled in the direction of the arrow P as shown in FIG. 12(a), to tighten the articles C. In this operation, the flexible locking piece 11b, being pushed by the articles C, is moved towards the inserting chamber 8, so that the locking protrusion lid engage the slot ends 11e; that is, the flexible locking piece 11b is set in a locking position for the band B. Thus, the bundling operation is accomplished. Thereafter, the surplus B" of the band B is removed as shown in FIG. 12(b).

Figure 13:
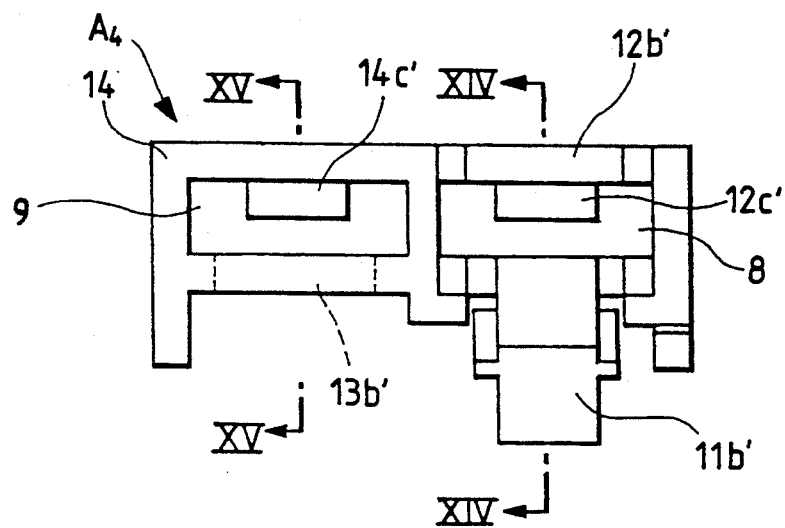
FIG. 13 is a front view of a fifth embodiment of the bundling fastener according to the invention.
Figure 14:
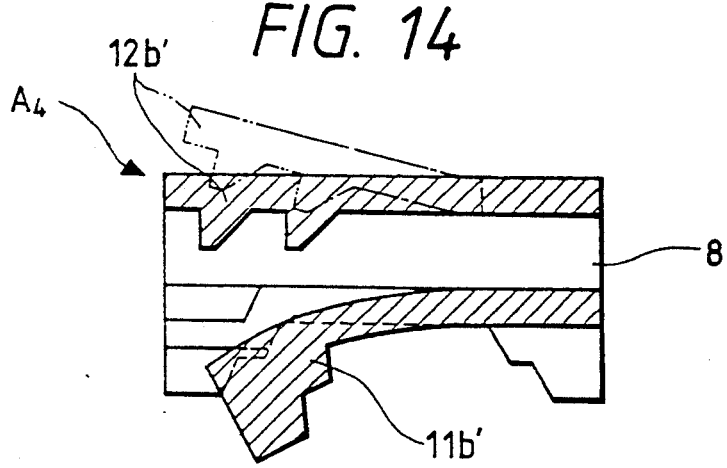
FIGS. 14 and 15 are sectional diagrams taken along line XIV—XIV and line XV—XV, respectively, in FIG. 13.
Figure 15:
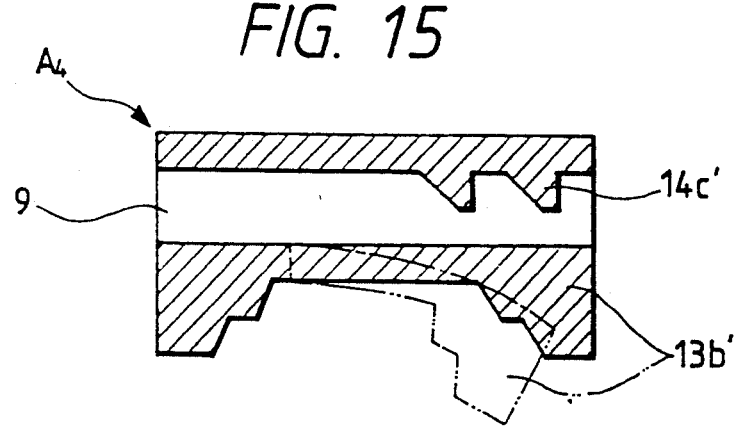

A fifth embodiment of the bundling fastener according to the invention will be described with reference to FIGS. 13–15. In the bundling fastener $A_4$, the inner wall 11 of its inserting chamber 8 includes a cantilevered flexible relief piece 11b', and the outer wall 12 includes a flexible locking piece 12b' with saw-tooth-shaped locking pieces 13c' which confront the above-described flexible relief piece 11b'. On the other hand, the inner wall 13 of its accommodating chamber includes a flexible relief piece 13b', and the outer wall 14 includes a saw-tooth-shaped locking protrusions 14c' confronting with the flexible relief piece 13b'.

Figure 16:
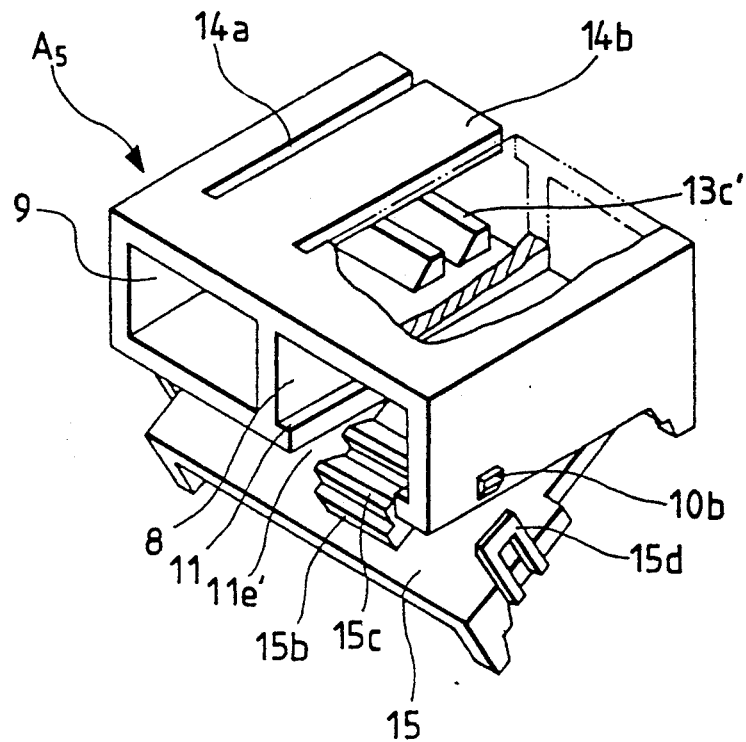
FIGS. 16 and 17 are perspective views showing sixth and seventh embodiments of the bundling fastener according to the invention, respectively.

FIG. 16 shows a sixth embodiment of the bundling fastener, including a modification to the bundling fastener shown in FIGS. 7 through 12. The bundling fastener $A_5$ has an overlapping board 15, which is coupled through a hinge to the outside of the inner walls 11 and 13 of the inserting chamber 8 and the accommodating chamber 9 which are provided side by side. The overlapping board 16 include a cantilever flexible locking piece 15b, which protrudes into the inserting chamber 8 through a lot 11e' formed in the inner wall 11. The flexible locking piece 15b has saw-tooth-shaped locking protrusions 15c. When the bundling fastener is not in use, the overlapping board 15 is opened downwardly, so that the flexible locking piece 15b is displaced from the inserting chamber 8, as shown in FIG. 16. When, on the other hand, the bundling fastener is in use, the overlapping board 15, being pushed by the articles C to be bundled, approaches the inner walls 11 and 13, so that its engaging pieces 15d are fixedly engaged with engaging protrusions 10b formed on the side walls 10. Thus, similar to the above-described case, the flexible locking piece 15b lock the bundling band B in the inserting chamber 8.

Additionally, saw-tooth-shaped locking protrusions 13c' are formed on the inner wall 13 of the accommodating chamber 9, and slits 14a are formed in the upper wall 14, to form a flexible relief piece 14b which is confronted with the saw-tooth-shaped locking protrusions 13c'.

Figure 17:
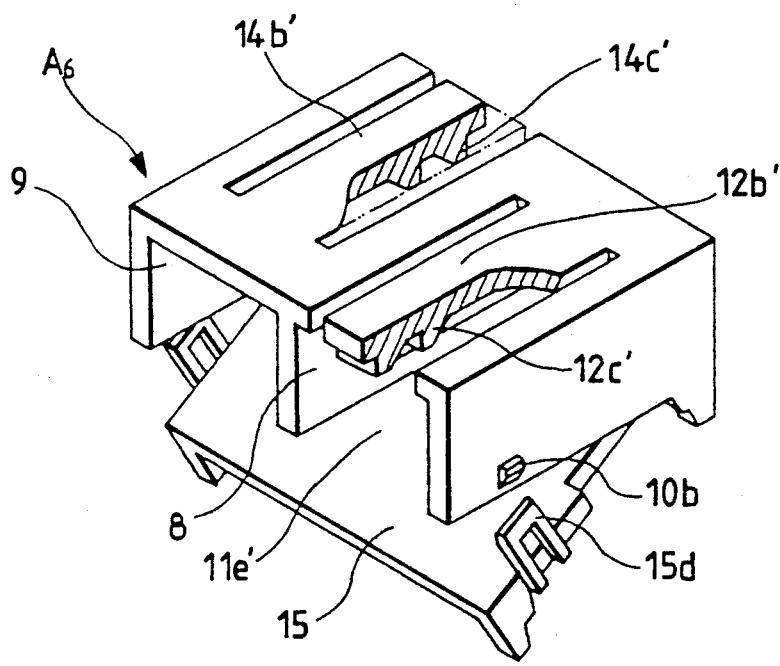

A seventh embodiment of the bundling fastener according to the invention is shown in FIG. 17. In the bundling fastener $A_6$, the inserting chamber 8 and accommodating chamber 9 have no inner walls, and the overlapping board 15 has no flexible locking piece (15b). Rather, the outer wall 12 of the inserting chamber 8 includes a flexible locking piece 12b' with saw-tooth-shaped locking protrusions 12c' extended inwardly toward the inserting chamber 8 and the upper wall 14 of the accommodating chamber 9 has a flexible locking piece 14b' with saw-tooth-shaped locking protrusions 14c'.

Figure 18:
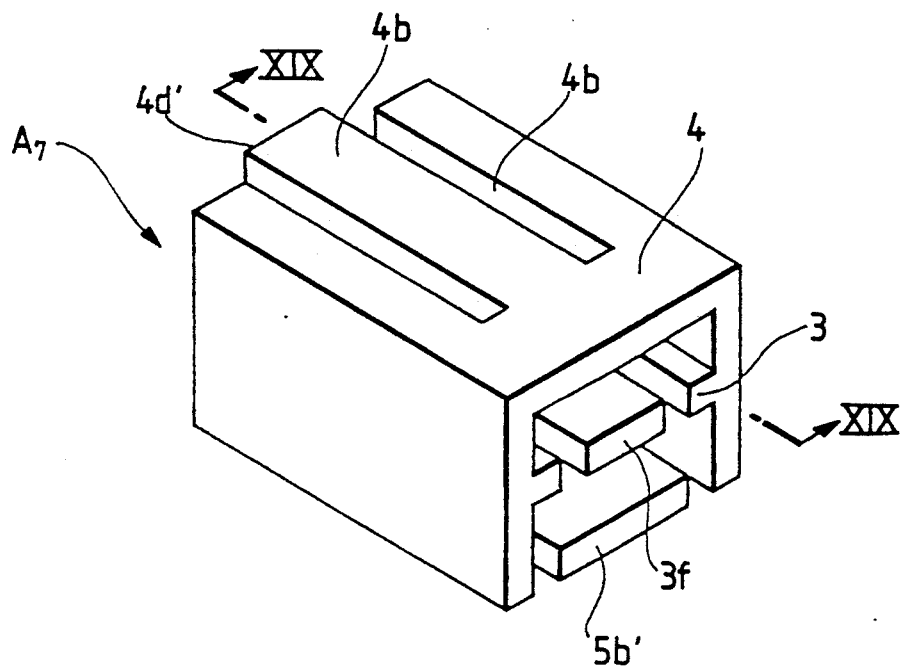
FIG. 18 is a perspective view showing an eighth embodiment of the bundling fastener according to the invention.
Figure 19:
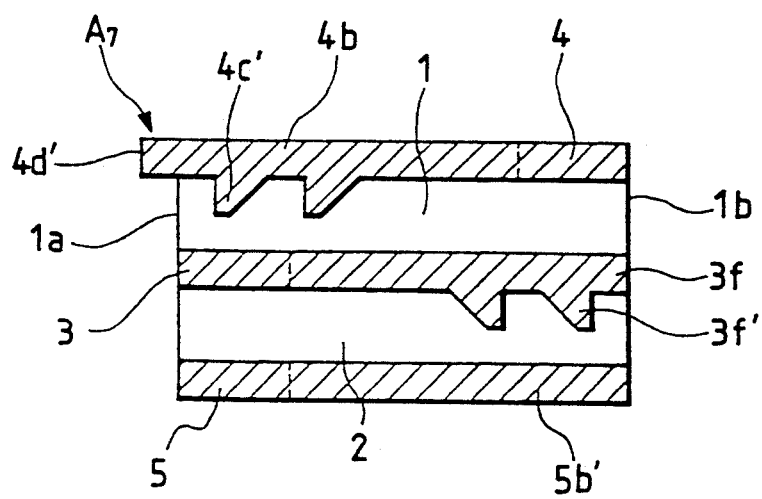
FIG. 19 is a sectional view taken along line XIX—XIX in FIG. 18.
Figure 20A:
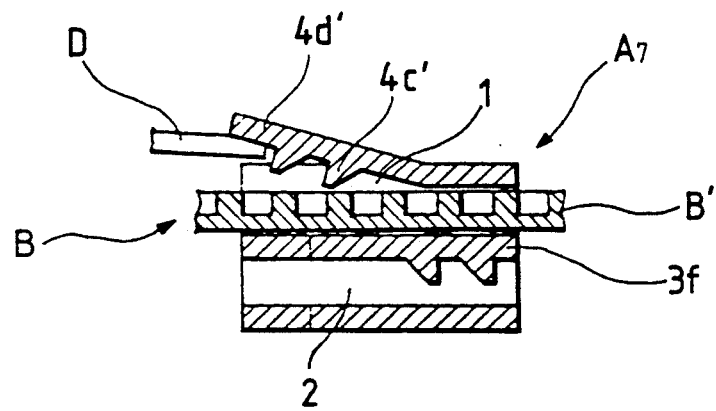
FIGS. 20 (a), 20(b) and 20(c) are sectional diagrams for describing the operation of bundling elongate articles with the bundling fastener and the band illustrated in FIG. 18.
Figure 20B:
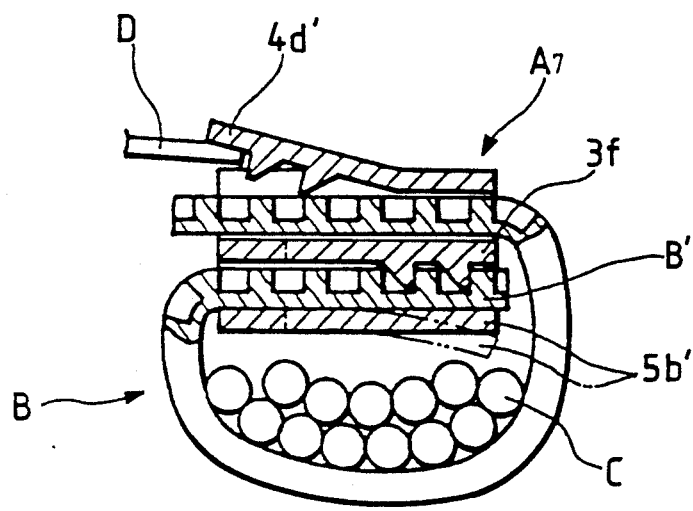
Figure 20C:
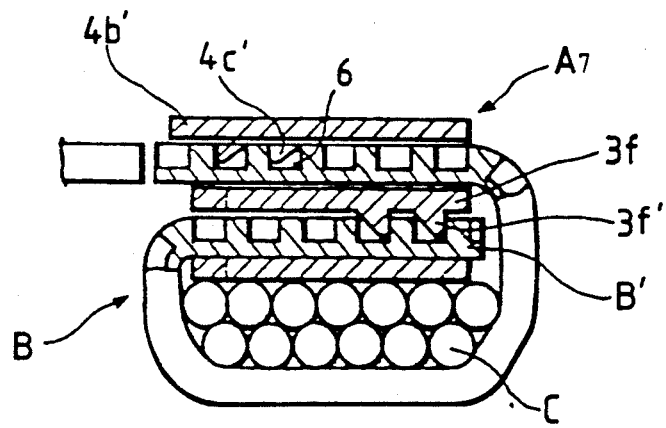
Figure 21:
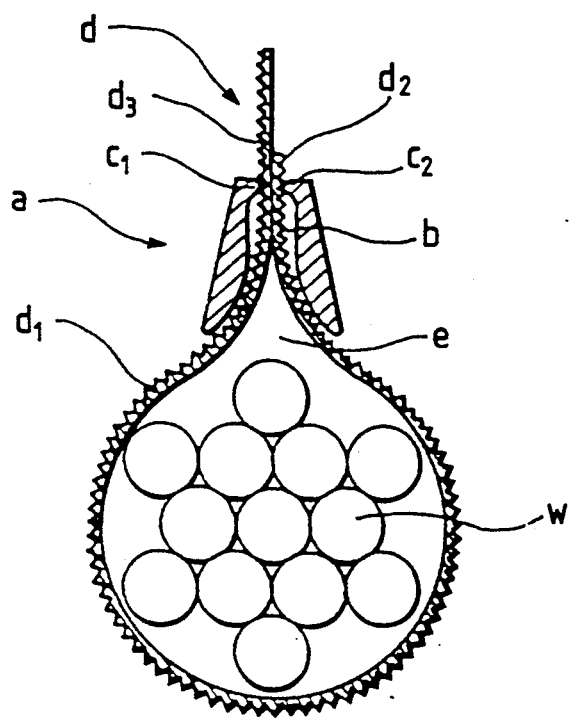
FIGS. 21 and 22 are sectional views showing examples of conventional bundling fasteners.
Figure 22:
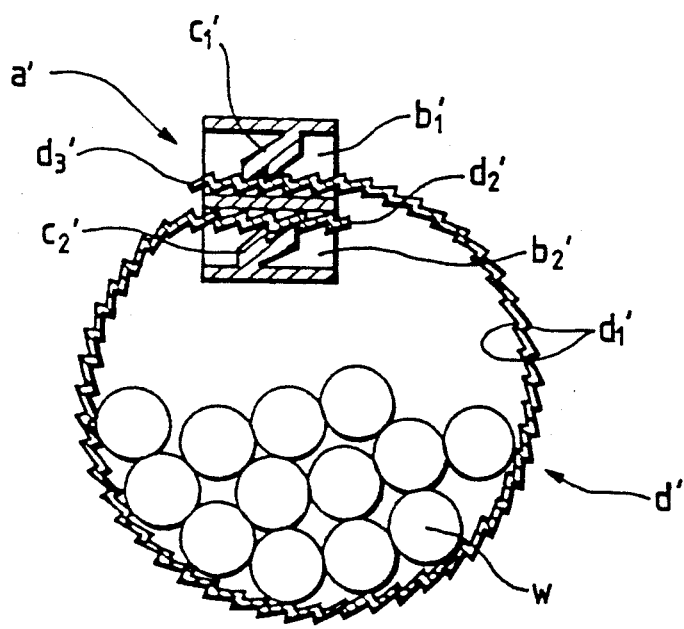

An eighth embodiment of the bundling fastener according to the invention is shown in FIGS. 18 through 20. The bundling fastener $A_7$ has an inserting chamber 1 disposed above an accommodating chamber 2. Slits 4a are formed in the outer wall 4 of the inserting chamber 1 on the side of its opening 1a, to form a flexible locking piece 4b having saw-tooth-shaped locking protrusions 4c' and an operating end portions 4d'. The partition wall 3 of the accommodating chamber 2 includes a flexible locking piece 3f with saw-tooth-shaped locking protrusions 3f', and the inner wall 5 includes a flexible relief piece 5b' which confronts the flexible locking piece 3f.

As shown in FIG. 20(a), while the flexible locking piece 4b is being deflected through the operating end portion 4d' with a jig D, the end portion B' of the bundling band B is inserted into the inserting chamber 1, and pulled therethrough. While bundling the articles C, the end portion B' is inserted into the accommodating chamber 2. As a result, the end portion B' is locked with the flexible locking piece 3f while deflecting the flexible relief piece 5b'. Under this condition, the supply roll of the band B is pulled while deflecting the flexible locking piece 4 outwardly. Thereafter, the flexible locking piece 4b is restored to its downward position to positively lock the band B, as illustrated in FIG. 4(c). Under this condition, the surplus of the band B is removed.

As was described above, in the bundling fastener according to the invention, the inserting chamber into which the bundling band is inserted, and the accommodating chamber for receiving the end of the bundling band are juxtaposed adjacent to each other, and have a height substantially equal to the thickness of the bundling band. Further each of the chambers includes a flexible deflecting means and saw-tooth-shaped locking protrusions to be engaged with the engaging means of the band in such a manner that the saw-tooth-shaped locking protrusions of the inserting chamber are opposite in direction to those of the accommodating chamber. Hence, with the bundling fastener of the invention, the bundling band can be economically used, and the bundling operation efficiently utilizes space.

While the invention has been described in connection with the preferred embodiment of the invention, it will be obvious to those skilled in the art that various changes and modifications may be made therein without departing from the invention, and it is intended, therefore, to cover in the appended claims all such changes and modifications as fall within the true spirit and scope of the invention.

What is claimed is:

1. A fastener for securing a bundling band having engaging means formed along a longitudinal axis thereof, comprising:
   a body including:
   an insertion chamber into which said bundling band is inserted;
   an accommodating chamber disposed adjacent said insertion chamber for receiving an end of said band,
   said insertion chamber and said accommodating chamber having a height substantially equal to the thickness of said band,
   each of said chambers including a flexible deflecting member and a locking protrusion extending into each of said chambers and being engageable with said engaging means of said band to cooperatively lock said band within said chambers, said protrusions of said insertion chamber extending in opposite directions to that of said accommodating chamber, wherein at least one of said chambers includes a relief piece opposing said corresponding deflecting member of said one chamber to allow axial movement of said band in said one chamber.

2. The fastener of claim 1 wherein said insertion chamber and said accommodating chamber are disposed horizontally with respect to one another in a widthwise direction of said band.

3. The fastener of claim 2 wherein said locking protrusions are respectively disposed on said deflecting members.

4. The fastener of claim 2, wherein said relief piece comprises an overlapping board hinged to said body and partially defining said insertion chamber, said fastener further comprising means for locking said board in a locked position wherein said protrusions lock said band within said insertion chamber.

5. The fastener of claim 4 wherein said deflecting member is disposed on said board and has said protrusions disposed thereon extending into said insertion chamber.

6. The fastener of claim 1 wherein said deflecting members is disposed between said insertion chamber and said accommodating chamber.

7. The fastener of claim 6 wherein said protrusion extending into said insertion chamber is disposed on said one deflecting member.

8. The fastener of claim 7 wherein said deflecting member is naturally deflected toward said accommodating chamber, said one deflecting member being deflected toward said insertion chamber when said band is inserted into said accommodating chamber.

9. The fastener of claim 1 wherein said locking protrusions are respectively disposed on said deflecting members.

10. The fastener of claim 1, further comprising a mounting clamp extending therefrom for mounting said fastener to an object.

11. The fastener of claim 1 wherein said body has a recessed portion on a side thereof adjacent said article to be bound such that an article can be partially disposed within said recessed portion.

12. The fastener of claim 1 wherein said deflecting members extend in opposite direction from one another.

13. The fastener of claim 1, wherein said relief piece is flexible.

14. A fastener for securing a bundling band having engaging means formed along a longitudinal axis thereof, comprising:
a body including:
an insertion chamber into which said bundling band is inserted;
an accommodating chamber disposed adjacent said insertion chamber for receiving an end of said band,
said insertion chamber and said accommodating chamber having a height substantially equal to the thickness of said band,
each of said chambers including a flexible deflecting member and a locking protrusion extending into each of said chambers and being engageable with said engaging means of said band to cooperatively lock said band within said chambers, said protrusions of said insertion chamber extending in opposite directions to that of said accommodating chamber, wherein said insertion chamber and said accommodating chamber are disposed vertically with respect to one another in a first direction corresponding to a direction of thickness of said band and extend in a second direction transverse to said first direction.

15. The fastener of claim 14 wherein said deflecting member of said insertion chamber includes an operating end portion adapted to be deflected away from said insertion chamber such that said band can be inserted therein.

16. A fastener for securing a bundling band having engaging means formed along a longitudinal axis thereof, comprising:
a body including:
an insertion chamber into which said bundling band is inserted;
an accommodating chamber disposed adjacent said insertion chamber for receiving an end of said band,
said insertion chamber and said accommodating chamber having a height substantially equal to the thickness of said band,
each of said chambers including a flexible deflecting member and a locking protrusion extending into each of said chambers and being engageable with said engaging means of said band to cooperatively lock said band within said chambers, said protrusions of said insertion chamber extending in opposite directions to that of said accommodating chamber, said fastener further comprising a flexible relief member for each of said chambers confronting each of said lock protrusions in each of said chambers, said relief members respectively urging said band toward said lock protrusions to cause said engaging means to be engaged by said lock protrusions.

17. The fastener of claim 16 wherein said relief member for said insertion chamber is disposed between said chambers and is deflected toward said accommodating chamber, said one relief member being urged toward said insertion chamber when said band is inserted into said accommodating chamber.

18. A fastener for securing a bundling band having engaging means formed along a longitudinal axis thereof, comprising:
a body including:
an insertion chamber into which said bundling band is inserted;
an accommodating chamber disposed adjacent said insertion chamber for receiving an end of said band,
said insertion chamber and said accommodating chamber having a height substantially equal to the thickness of said band,
each of said chambers including a flexible deflecting member and a locking protrusion extending into each of said chambers and being engageable with said engaging means of said band to cooperatively lock said band within said chambers, said protrusions of said insertion chamber extending in opposite directions to that of said accommodating chamber, said fastener further comprising means for locking said deflecting member provided in said insertion chamber in a locked position after said band has been inserted therein.

19. The fastener of claim 18 wherein said deflecting member is urged into said locking position by articles around which said band is wrapped when said band is tightened therearound.

20. A fastener for securing a bundling band having engaging means formed along a longitudinal axis thereof, comprising:
    a body including:
    an insertion chamber into which sad bundling band is inserted;
    an accommodating chamber disposed adjacent said insertion chamber for receiving an end of said band,
    said insertion chamber and said accommodating chamber having a height substantially equal to the thickness of said band,
    each of said chambers including a flexible deflecting member and a locking protrusion extending into each of said chambers and being engageable with said engaging means of said band to cooperatively lock said band within said chambers, said protrusions of said insertion chamber extending in opposite directions to that of said accommodating chamber, wherein said insertion chamber and said accommodating chamber are disposed vertically with respect to one another in a direction of thickness of said band, and wherein said deflecting member of said insertion chamber includes an operating end portion adapted to be deflected away from said insertion chamber such that said band can be inserted therein.

21. The fastener of claim 20, wherein said accommodating chamber includes a relief piece opposing said corresponding deflecting member in said accommodating chamber to allow axial movement of said band in said accommodating chamber.

22. A method of bundling a plurality of elongate articles together with a band having engaging means formed along a longitudinal axis thereof utilizing a fastener including an insertion chamber and an accommodating chamber disposed adjacent one another, said chambers respectively including first and second flexible locking members having locking protrusions extending into said chambers and being engageable with said engaging means of said band, said protrusions of said insertion chamber extending in a first direction and said protrusions of said accommodating chamber extending in an second opposite direction, comprising the following steps:
    deflecting said first locking member outwardly to a deflected position;
    inserting an end of said band into and through said insertion chamber in said second direction with said locking member in said deflected position such that a predetermined length of said band extends from said fastener;
    wrapping said end of said band around said articles;
    inserting said end of said band into said accommodating chamber in said second direction such that said locking protrusions of said second locking member engage said engaging means of said band to prevent said band from moving in said first direction in said accommodating chamber;
    pulling an opposite end of said band, which extends from said insertion chamber in said first direction with said first locking member deflected to said deflected position until said band is tightly wrapped around said articles; and
    allowing said first locking member to return to an undeflected position such that said protrusions thereof engage said engaging means of said band so as to retain said band in a tightened condition.

23. The method of claim 22, further comprising the step of cutting said opposite end of said band adjacent said insertion chamber.

* * * * *